United States Patent
Estipona

(10) Patent No.: US 6,795,973 B1
(45) Date of Patent: Sep. 21, 2004

(54) ENHANCED TELEVISION RECORDER AND PLAYER

(75) Inventor: Jim B. Estipona, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/579,244

(22) Filed: May 25, 2000

(51) Int. Cl.[7] .................. H04N 7/16; H04N 5/445; H04N 7/173; G06F 3/00; G06F 13/00

(52) U.S. Cl. ................ 725/136; 725/40; 725/51; 725/109; 725/110; 725/112; 725/113

(58) Field of Search .................. 725/51, 110, 109, 725/112–113, 40, 42–43, 136, 138

(56) References Cited

U.S. PATENT DOCUMENTS

| | | | |
|---|---|---|---|
| 5,134,499 A | 7/1992 | Sata et al. | |
| 5,479,302 A | 12/1995 | Haines | |
| 5,485,553 A | 1/1996 | Kovalick et al. | |
| 5,931,908 A | 8/1999 | Gerba et al. | |
| 5,991,799 A | 11/1999 | Yen et al. | |
| 6,108,706 A * | 8/2000 | Birdwell et al. | 709/229 |
| 6,134,379 A | 10/2000 | LaMacchia | |
| 6,400,407 B1 * | 6/2002 | Zigmond et al. | 725/51 |
| 6,415,438 B1 * | 7/2002 | Blackketter et al. | 725/136 |
| 6,460,180 B1 * | 10/2002 | Park et al. | 725/40 |
| 6,480,667 B1 | 11/2002 | O'Connor | |
| 6,557,172 B1 * | 4/2003 | Carr | 725/139 |
| 6,560,777 B2 * | 5/2003 | Blackketter et al. | 725/110 |
| 6,571,392 B1 * | 5/2003 | Zigmond et al. | 725/110 |
| 6,574,795 B1 * | 6/2003 | Carr | 725/71 |
| 6,591,058 B1 | 7/2003 | O'Connor et al. | |
| 6,668,378 B2 * | 12/2003 | Leak et al. | 725/136 |
| 2001/0003212 A1 * | 6/2001 | Marler et al. | 725/40 |
| 2002/0059644 A1 * | 5/2002 | Andrade et al. | 725/136 |
| 2003/0056224 A1 * | 3/2003 | Stone | 725/112 |
| 2003/0126621 A1 * | 7/2003 | Leak et al. | 725/135 |
| 2003/0133043 A1 * | 7/2003 | Carr | 348/563 |

FOREIGN PATENT DOCUMENTS

| | | | |
|---|---|---|---|
| EP | 0 808 072 A2 | 11/1997 | |
| EP | 0 942 595 A2 | 9/1999 | |
| EP | 1111922 A2 * | 6/2001 | ............ H04N/7/16 |
| WO | WO 98/48566 | 10/1998 | |
| WO | WO 00/36823 | 6/2000 | |
| WO | WO 01/11874 A1 | 2/2001 | |
| WO | PCT/US 01/01706 | 8/2001 | |
| WO | WO 200161992 A1 * | 8/2001 | ............ H04N/5/00 |

OTHER PUBLICATIONS

Steinhorn, Jason and Mark Kohler; "Enhancing TV with ATVEF", Embedded Systems Programming, Oct. 1999, pp. 55–64.*

Advanced Television Enhancement Forum (ATVEF), Enchanced Content Specification, version 1.1, revision 26, 1998–1999.

Web pages downloaded from http://www.replaytv.com, "What is ReplayTV?", 1998–2000.

Web pages downloaded from http://www.tivo.com, "What is TiVo?", 2000.

"Hitachi Plans Flexible DVD Video Recorder", Electronic Engineering Times, Jun. 16, 1997, p. 8.

* cited by examiner

*Primary Examiner*—John Miller
*Assistant Examiner*—Michael W. Hoye
(74) *Attorney, Agent, or Firm*—Blakely, Sokoloff, Taylor & Zafman LLP

(57) ABSTRACT

An enhanced television recorder and player includes a trigger inserter unit that inserts triggers into vertical blanking intervals of audio/video signals. The triggers point to resources that are stored in a storage medium or are available from a network, where the triggers, audio/video signals, and resources together can comprise a Transport Type B transmission. The audio/video signals having triggers in the vertical blanking intervals are stored in the storage medium, and during playback by a stream simulator unit, simulate a Transport Type A transmission, transformed from the Transport Type B transmission. Requested resources may be retrieved from the storage medium or from the network by a proxy unit of the receiver unit.

17 Claims, 2 Drawing Sheets

ENHANCED TELEVISION RECORDER AND PLAYER

BACKGROUND OF THE INVENTION

1. Field of the Invention

The present invention relates generally to communications, and in particular relates to a recorder and player for enhanced television systems.

2. Background Information

The Internet and the World Wide Web provide users with a rich source of information. Indeed, the Internet has infiltrated many aspects of everyday life, and is extremely popular because of its ease of access and ease of use.

There is an increasing integration of Internet technology/features with conventional communication media. Enhanced or interactive television, for example, merges Internet capabilities with television broadcasts. With enhanced television technology, content creators (e.g., broadcasters) transmit hypertext markup language (HTML) data along with the traditional audiovisual signals, thereby allowing viewers to interact with the television broadcast via the Internet. For instance, while watching an enhanced television program broadcasted by a particular network, the viewer may be provided with enhanced features on the television screen that allows the viewer to access the network's web site for additional programming information.

With other systems, the viewer may be provided with appliances or "receivers" that store the programming content as it is broadcasted. Such programming content is stored in the user's computer hard drive, for example, without having to use a videocassette recorder and videocassette. ReplayTV™ and TiVo™ systems are examples.

The Advanced Television Enhancement Forum's (ATVEF) Enhanced Content Specification, version 1.1, revision 26, 1998–1999 (hereinafter referred to as "ATVEF specification") has been published to provide uniformity among different enhanced television content creators, transport operators, and receivers. The ATVEF specification provides standards for the transmission and processing of triggers, resources, announcements and content that are associated with an enhanced television transmission.

However, even with the ATVEF specifications, existing enhanced television technologies still suffer from a number of drawbacks. There is often a lack of satisfactory synchronization between announcements, triggers, and content. There are also, at times, incompatibility issues between Transport Type A and Transport Type B (e.g., ATVEF transport types) transmission and reception hardware and software used by these existing enhanced television systems, including the inability to satisfactorily record incoming triggers and/or resources. Furthermore, complex components or complicated customization may need to be provided to existing users' receivers in order to provide users with the full benefits/features of enhanced television.

Accordingly, improvements in enhanced television systems are desirable.

BRIEF DESCRIPTION OF THE DRAWINGS

Non-limiting and non-exhaustive embodiments of the present invention will be described in the following figures, wherein like reference numerals refer to like parts throughout the various views unless otherwise specified.

DETAILED DESCRIPTION OF THE ILLUSTRATED EMBODIMENTS

Embodiments of an apparatus and method for recording and playing enhanced television information are described in detail herein. In the following description, numerous specific details are provided, such as the description of various client-side components in FIG. 1, to provide a thorough understanding of embodiments of the invention. One skilled in the relevant art will recognize, however, that the invention can be practiced without one or more of the specific details, or with other methods, components, etc. In other instances, well-known structures or operations are not shown or described in detail to avoid obscuring aspects of various embodiments of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As an overview, an embodiment of the invention may be based on the ATVEF specification, for example, to provide enhanced television information to a viewer or user. Specifically, an embodiment of the invention provides an enhanced television recorder and player, where Transport Type B and Transport Type A broadcast data may be recorded (into a cache, for example), and then the Transport Type B data is transformed into a simulated Transport Type A stream. As will be described in further detail below, this transformation takes advantage of synchronization features present in Transport Type A streams and takes advantage of the fact that many enhanced television receivers are well suited as Transport Type A receivers.

Figure 1:
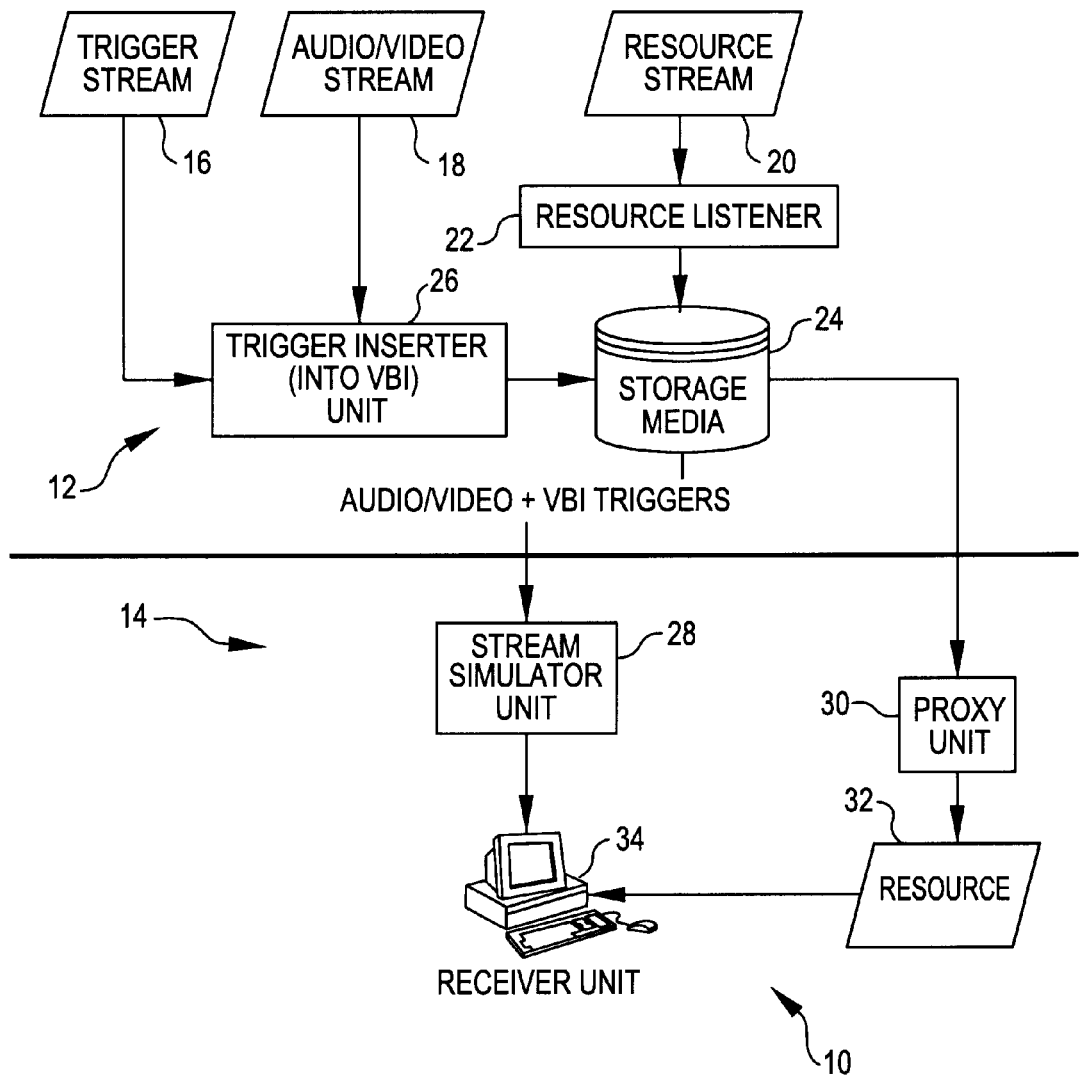
FIG. 1 is a functional block diagram illustrating an embodiment of the invention.

Referring first to FIG. 1, shown generally at 10 is a system according to an embodiment of the invention. In this embodiment, the system 10 may be located at the client (e.g., user) side of the transmission (e.g., as a unit coupled to a computer, television, etc.). The system 10 may operate based on the ATVEF specification, and it is to be appreciated that principles of embodiments of the invention may be applicable to variations of the ATVEF specification or to other specifications. Accordingly, specifications, protocols, and/or components such as hypertext transfer protocol (http), file transfer protocol (ftp) ECMAScript and Document Object Model (DOM), Internet Protocol (IP), cascading style sheets (CSS), and various media and video standards, such as National Television Standards Committee (NTSC), can be utilized by the system 10 to provide an enhanced television experience to the user.

In FIG. 1, the system 10 includes a recording component or "recorder" 12, and a playback component or "player" 14. According to one embodiment of the invention, the recorder 12 stores Transport Type B streams (and can also store Transport Type A streams), while the player 14 can transform and play the stored streams as Transport Type A streams.

As is known, an enhanced television Transport Type B transmission includes a trigger stream 16, an audio/video stream 18, a resource stream 20, and an announcement stream (not shown). The audio/video stream 18 is generally an NTSC signal. A "trigger" is typically a real-time event, in the form of a uniform resource locator (URL) followed by attribute/value pairs, that is sent from the broadcaster (e.g. from a head-end) to a receiver to initiate enhanced television features, either automatically or with user confirmation. A "resource", sometimes referred to "enhancement" or "enhanced content" is a generic term for any type of information or data that may go into a web page, such as HTML files, GIF files, TIF files, hypertext links, etc. In operation, announcements are sent before or during a television program to a well-known IP address and port number to announce the availability of enhancements. The receiver tunes in to this IP address/port and receives other information as to where to "listen" to receive trigger and resource information, where the trigger typically includes a URL that points to a location of the resource(s).

If resources in the resource stream 20 are extracted by a resource listener 22, such resources are typically stored in a storage medium 24, which may be a cache, for example. The storage medium 24 may also be a hard disk, floppy disk, digital versatile disk, random access memory (RAM), compact disk, or other suitable machine-readable storage medium. The resource listener 22 may be programmed to reject duplicate or outdated resources, such that only the necessary resources are stored in the storage medium 24.

If the resources are stored in the storage medium 24, the trigger(s) corresponding to the various stored resources typically include a local identifier URL (e.g., a lid: URL), meaning that the resources were delivered using a one-way broadcast and are not available on-demand. As such, Transport Type B is used for a true broadcast of both resource data and triggers and can run without an Internet connection. An optional Internet connection can provide a return path if the triggers point (e.g., by using http: or ftp: URLs) to resources that are available on the Internet (e.g., for e-commerce or web browsing).

As is known, Transport Type A involves the delivery of triggers along with the audio/visual stream 18. That is, existing Transport Type A transmissions often transmit triggers on the Vertical Blanking Interval (VBI) Line 21 of the NTSC video signal. In contrast to Transport Type B transmissions, Transport Type A transmissions do not transmit a resource stream 20 or an announcement stream. Hence, Transport Type A systems usually use two-way Internet connections to fetch resources using http:.

An embodiment of the invention improves upon existing Transport Type A and Transport Type B systems by providing the system 10 with a trigger inserter unit 26 for the recorder 12, and a stream simulator unit 28 (which can be likened to a Transport Type A stream simulator) and a proxy unit 30 for the player 14. The end result is that one or more resources 32 may be provided to a receiver unit 34, from the storage medium 24, without having to unnecessarily retrieve the resources 32 from the Internet. Furthermore, using the trigger inserter unit 26 to insert triggers into the VBI of video signals of the audio/video stream 18 provides synchronization between the trigger stream 16 and the audio/video stream 18 that is not present in conventional Transport Type B systems.

Figure 2:
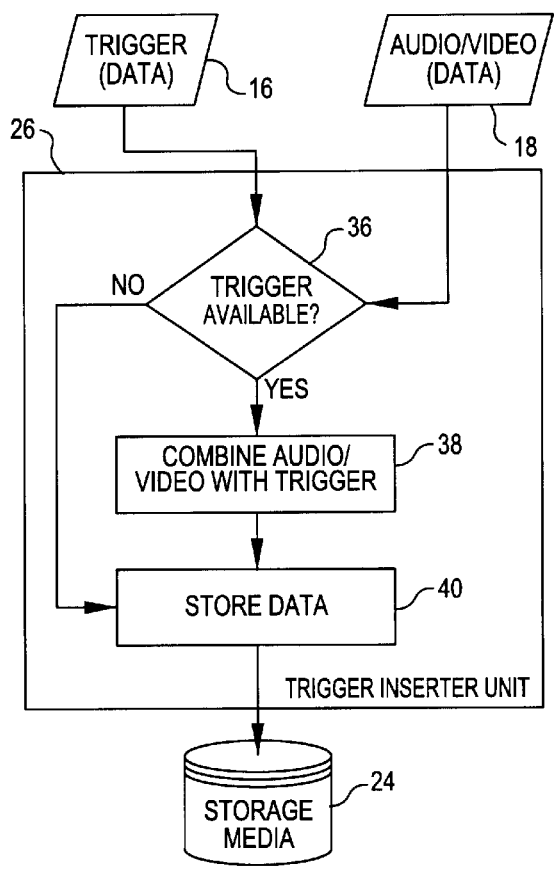
FIG. 2 is a flow diagram showing operation of an illustrative type of trigger inserter unit that can be used with the embodiment shown in FIG. 1.

Operation of an embodiment of the trigger inserter unit 26 of the recorder 12 is illustrated in a flow diagram in FIG. 2. The trigger inserter unit 26 can be embodied in software, hardware, or a combination of both, and uses data from the trigger stream 16 and data from the audio/video stream 18 as inputs. It is assumed that other supporting infrastructure of the system 10, such as some of those shown in FIG. 1 and various other software and viewer application components, is present to determine that programming and/or enhancements are to be recorded. Furthermore, it is assumed that if a Transport Type B transmission is taking place, the resource listener 22 is operating to store resource data from the resource stream 20 into the storage medium 24. For the sake of clarity, operation of these components is not described in detail herein because they would be familiar to those skilled in the art based on the description herein.

At a block 36, the trigger inserter unit 26 first checks if there is a trigger available in the received broadcast. If the received broadcast is a Transport Type A transmission, such triggers, if any, are in the VBI of the audio/video stream 18 and are extracted and evaluated for validity as part of the receiving process. If the triggers are valid, the trigger inserter unit 26 stores the data from the audio/video stream 18 (and its associated valid triggers) into the storage medium 24 at a block 40. It is noted that some broadcasts simply may not include triggers, and so at the blocks 36 and 40, the trigger inserter unit 26 directly stores data from the audio/video stream 18 into the storage medium 24.

If a Transport Type B transmission is present, then the trigger inserter unit 26 detects the availability of valid triggers from the trigger stream 16 at the block 36. At a block 38, the trigger inserter unit 26 combines the trigger data with the audio/visual data. More specifically, according to an embodiment of the invention, the trigger inserter unit 26 inserts triggers into Line 21 of the VBI of the audio/visual stream 18. In this manner, the Transport Type B stream is "transformed" into Transport Type A stream prior to storage into the storage medium 24 at the block 40. Accordingly, by inserting the triggers into the VBI, as the trigger stream 16 and the audio/visual stream 18 are received, the triggers are kept synchronized in time with the audio/visual data by presenting the triggers along with their corresponding video frames.

It is noted that although the incoming broadcasts are described herein as analog-type signals, such as NTSC signals, it is understood that principles of embodiments of the invention may be implemented on non-analog input signals. For instance, while an embodiment of the invention inserts triggers into the VBI of an analog NTSC signal, it is possible to provide an embodiment that inserts triggers into a digital input signal. In such a case, the triggers can be inserted, for example, between blocks of data that define video frames.

At the block 40, the trigger inserter unit 26 stores the data into the storage medium 24 using a suitable type of audio/video streaming and storage format. Formats such as RealVide™/RealAudio™, Flash™, QuickTime™, Audio Video Interleaved (AVI), Motion Pictures Experts Group (MPEG), DVD, etc. may be used.

As previously discussed above, the trigger information present in the VBI, whether inserted by the trigger inserter unit 26 or originally present from a Transport Type A transmission, includes URLs pointing to locations of resources. These URLs may be in the form of lid: URLs pointing to the storage medium 24 if the corresponding resources were extracted from the resource listener 22 and subsequently stored in the storage medium 24. The URLs in the trigger may also be http: URLs if the corresponding resource is available both from the storage medium 24 and from the Internet. Similarly, other URL schemes, such as ftp:, may be used by the triggers to denote the location of resources available from the storage unit 24 or from the Internet. In one embodiment, the resource listener 22 can extract all necessary resources from the resource stream 20, regardless of its specific URL, and then store these resources in the storage medium 24, so that requests for these resources from external web servers can be minimized. This avoids a large number of simultaneous hits on the web servers from multiple receivers requesting the resources. The manner of retrieving stored resources from the storage medium 24, rather than from an external Internet source, is described in further detail below with respect to the proxy unit 30.

Figure 3:
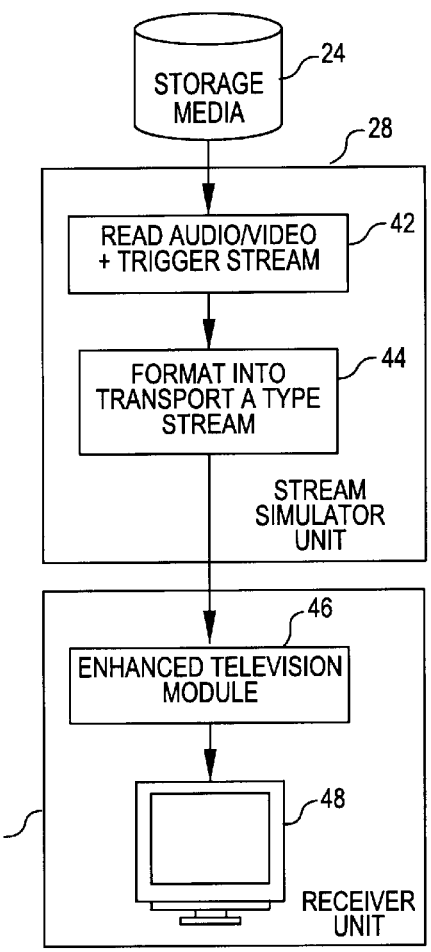
FIG. 3 is a flow diagram showing operation of an illustrative type of stream simulator unit that can be used with the embodiment shown in FIG. 1.

FIG. 3 shows an embodiment of the stream simulator unit 28 that can be used by the player 14. The stream simulator unit 28 can be embodied in software, hardware, or a combination of both. In operation, the stream simulator unit 28 reads, from the storage medium 24, the stored audio/video stream 18 and the trigger stream 16 at a block 42. No additional formatting/transformation needs to be performed according to one embodiment of the stream simulator unit 28, if the format that the trigger inserter unit 26 had used to insert triggers into the VBI of the audio/video stream 18 and then to store the resulting stream (e.g., the simulated Transport Type A stream) is compatible with the eventual presentation application software. In another embodiment, the stream simulator unit 28 may perform additional formatting of the resulting stream at a block 44, in order to make the resulting stream compatible with the format used by the eventual presentation/display application software. For example, if Microsoft Window's DirectShow™ is used as the presentation software, then the stream simulator unit 28, at the block 44, can format the resulting stream into the DirectShow™ architecture using libraries in the Windows environment.

Next, the stream simulator unit 28 provides the simulated Transport Type A stream to the receiver unit 34. The receiver unit 34 can include any type of suitable real-time (or ATVEFF-enabled) viewer, application, or appliance that has the capability to receive Transport Type A broadcasts, or both Transport Type A or Transport Type B broadcasts, and to play them. As examples, the receiver unit 34 can comprise a personal computer (PC) having an enhanced television module 46 and a display unit 48. As another example, the receiver unit 34 can comprise a conventional television set as the display unit 48 and having the enhanced television module 46 as a separate unit coupled to the television set.

The enhanced television module 46 can be any type of suitable commercially available unit that has the capability to receive enhanced television broadcast data, display/announce the enhanced television features to the user, and then provide the user with interfaces to allow the user to input information (e.g., to interact) with the enhanced broadcast. In an embodiment of the invention, the features of the invention described herein may be provided to complement existing functionalities of the enhanced television module 46. In another embodiment, the enhanced television module 46 may be specifically programmed or designed to implement the inventive features described herein.

Figure 4:
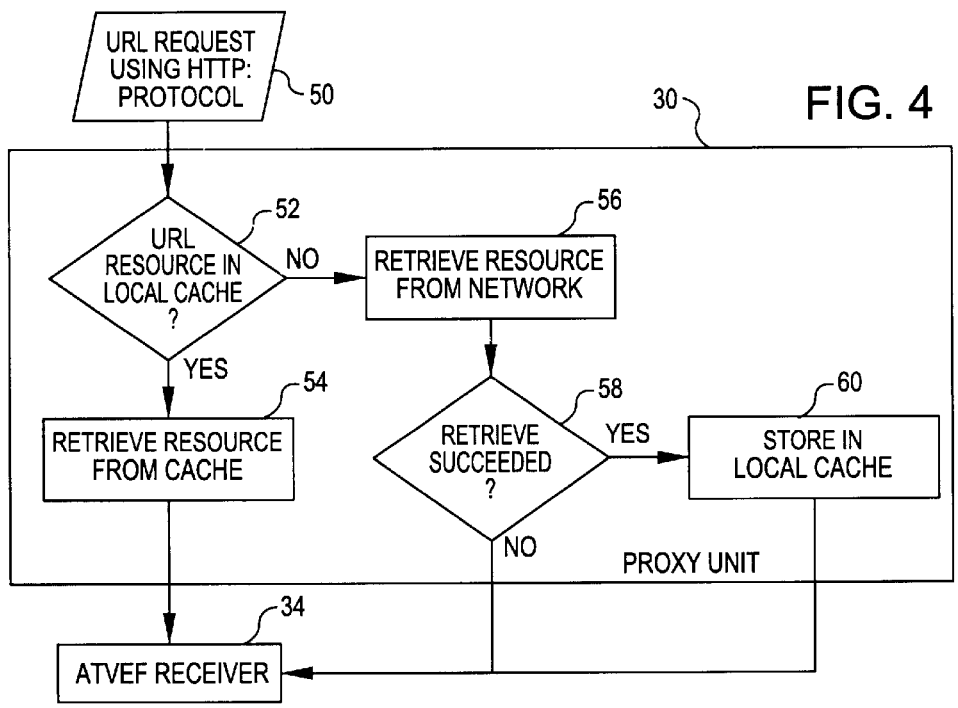
FIG. 4 is a flow diagram showing operation of an illustrative type of proxy unit that can be used with the embodiment shown in FIG. 1.

Operation of the player 14 using the receiver unit 34, the stream simulator unit 28, and the proxy unit 30 is shown in a flow diagram in FIG. 4. The proxy unit 30 may be thought of as an "http: proxy" in that it intervenes in the retrieval of resources 32 having http: URLs. The proxy unit 30 can also be made to intervene and retrieve resources 32 having lid: URLs or other protocol resources, such as a resource having an ftp: URL. That is, the proxy unit 30, in one embodiment, may comprise a thin/simple agent that can reroute a resource request and retrieve the requested resource from a local cache (e.g., from the storage medium 24) if available, but relinquishes or invokes a normal http: handler to perform the retrieval if the requested resource is not in the local cache (and assuming that an uplink or back channel to the Internet is available).

The proxy unit 30 can be embodied in software, hardware, or a combination of both. In an embodiment, the proxy unit 30 can comprise a set of software communication instructions or settings in a registry of an operating system of a PC, for example. In another embodiment or implementation, a specific and new http: handler may be used instead of the proxy unit 30 to replace the original http: handler. Similarly, ftp: handling can be embodied in a proxy or in a new implementation.

In various embodiments, a new lid: handler may be a separate (installable) component or is integral to the http: proxy (e.g., a functional unit within the http: proxy unit 30). An advantage of implementing a proxy, such as the proxy unit 30, is that because the role of such a proxy is specific, it can be easier and faster to implement than if one were to design and build the whole component from the beginning, especially if there is no sample source code to mimic.

In operation, when the receiver unit 34 receives an enhanced television broadcast, in a simulated Transport Type A stream format having triggers inserted in the VBI, the user can request the resources 32 or the receiver unit 34 can automatically request the resources 32. Because the receiver unit 34 is assumed to be Transport Type A-enabled, the receiver unit 34 assumes that the requested resources 32 needs to be retrieved externally from the Internet. Therefore, at a block 50 in FIG. 4, the receiver unit 34 sends a URL request for the resource 32 using http: protocols. It is noted that if the trigger included a lid: URL, rather than an http: URL, then the receiver unit 34 and/or proxy unit 30 can retrieve the resource 32 directly from the storage medium 24, which can be a local cache.

At a block 52, the proxy unit 30 intercepts the http: request from the receiver unit 34 and checks if the resource 32 is in the storage medium 24. If it finds the resource 32 in the storage medium 24, then the resource 32 is retrieved from the storage medium 24 at a block 54, and is provided to the receiver unit 34 for display and/or other use by the receiver unit 34. Again it is noted that at the block 52, the proxy unit 30 may retrieve resources 32 having lid: URLs from the storage medium 24, as well as resources 32 having http: or ftp: URLs from the storage medium 24, if the resources 32 are stored there, or externally from the Internet.

If, at the block 52, the proxy unit 30 does not find the requested resource 32 in the storage medium 24, then at a block 56, the proxy unit 34 tries to retrieve the resource 32 from the network (e.g., from the Internet). If the retrieval is unsuccessful at a block 58, then a message is sent to the receiver unit 34, notifying it of the unsuccessful retrieval. In response, the receiver unit 34 may cause the proxy unit 30 to try again, or the receiver unit 34 may display a message to the user on the display unit 48 to notify the user of the unavailability of the resource 32 or other appropriate response.

If, back at the block 58, the resource 32 is successfully retrieved by the proxy unit 30, then the retrieved resource 32 can be stored in the storage medium 24 at a block 60, and then subsequently provided to the receiver unit 34, thereby providing the user with enhanced television content and features.

In conclusion, embodiments of the invention transform Transport Type B streams into a simulated Transport Type A stream by inserting triggers into the VBI. The recorder 12 stores resources and the transformed stream in the storage medium 24. During playback, the player 14 reads the triggers in the stored simulated Transport Type A stream from the storage medium 24 and uses the proxy unit 30 to retrieve requested resources from the storage medium 24 or externally from the Internet, if the resource is not already stored. As such, Transport Type B transmissions appear like and are treated like Transport Type A transmissions by the receiver unit 34. This provides advantages in that embodiments of the invention may easily complement existing Transport Type A systems without any undue and expensive installation or redesign. Furthermore, by inserting triggers into the VBI, the incoming streams of trigger and audio/video data can be synchronized and stored in a storage medium 24, in a manner unavailable to existing prior art systems.

The above description of illustrated embodiments of the invention is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

For example, while the figures show separate components for the recorder 12, player 14, trigger inserter unit 26, stream simulator unit 28, proxy unit 30, receiver unit 34, etc., one or more of these components (and/or their associated features or functions) can be combined into a single component. For instance, elements of the trigger inserter unit 26 and the stream simulator unit 28 can be combined into a single component. Furthermore, any of the components shown in the figures can be combined into the enhanced television module 46. That is, while the figures show separate and discrete components of the system 10 for the sake of clarity, an embodiment may combine several of these components into the enhanced television module 46 and/or into the receiver unit 34. In an example of an implementation, the enhanced television module 46 can include, for instance, one or more processors and machine-readable media having instructions stored thereon, which when executed by the processor(s), effect the various functions and features of the recorder 12 and player 14 described herein.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method, comprising:

receiving a Transport Type B stream, the Transport Type B stream having a trigger stream and an audiovisual stream, the trigger stream having trigger data corresponding to resource data, the audiovisual stream being received on at least two vertical blanking interval (VBI) lines including a VBI line 21, the audiovisual stream having audiovisual data;

inserting the trigger data into the VBI line 21 of the Transport Type B stream along with the audiovisual stream; storing the trigger data and input audiovisual stream in a storage medium; and based on the trigger data, retrieving corresponding resource data from the storage medium.

2. The method of claim 1 wherein the Transport Type B stream comprises a video stream, the method further comprising:

receiving a resource stream having resource data and storing the resource data in the storage medium;

inserting the trigger data from the trigger stream into the video stream; and detecting the trigger data in the video stream and retrieving the corresponding resource data from the storage medium or from an external source, if the corresponding resource data is not stored in the storage medium.

3. The method of claim 1, further comprising:

receiving a resource stream having resource data corresponding to trigger data; and storing the resource data in the storage medium.

4. The method of claim 1, further comprising:

reading the trigger data and Transport Type B stream from the storage medium; and formnatting the trigger data and Transport Type B stream into a simulated Transport Type A stream.

5. The method of claim 1, further comprising:

detecting a request for resource data; checking the storage medium for the requested resource data and retrieving the requested resource data if it is present in the storage medium; and retrieving the requested resource data from a network if the requested resource data is not present in the storage medium.

6. The method of claim 5, further comprising storing the requested resource data retrieved from the network in the storage medium.

7. A method, comprising:

receiving a Transport Type B having a trigger stream, a video stream, and a resource stream;

combining trigger data from the trigger stream with the video stream to obtain a a simulated Transport Type A stream;

storing resource data from the resource stream in a storage medium; detecting trigger data in the resulting stream; and responsively retrieving resource data associated with the detected trigger data from the storage medium if the resource data is stored in the storage medium.

8. The method of claim 7, further comprising, if the resource data is not stored in the storage medium, retrieving the resource data from an external network.

9. The method of claim 7 wherein responsively retrieving resource data associated with the detected trigger data from the storage medium comprises:

intercepting a request to retrieve the resource data from an external network; and retrieving the requested resource data from the storage medium instead, if the requested resource data is stored in the storage medium.

10. An apparatus, comprising:

a trigger inserter unit to combine trigger data with a Transport Type B stream to obtain a simulated Transport Type A stream;

a stream simulator unit communicatively coupled to the trigger inserter unit to provide the simulated Transport Type A stream to a receiver unit; and a proxy unit responsive to the receiver unit to retrieve resource data associated with the trigger data in the simulated Transport Type A stream.

11. The apparatus of claim 10 wherein the proxy unit is capable to retrieve the resource data associated with the trigger data from a local storage medium, if the resource data is stored in the local storage medium, or from an external network, if the resource data is not stored in the local storage medium.

12. The apparatus of claim 10 wherein the Transport Type B stream comprises a video stream and wherein the trigger inserter unit is capable to insert the trigger data into a vertical blanking interval of the video stream.

13. The apparatus of claim 10 wherein the trigger inserter unit is capable to store the simulated Transport Type A stream in a local storage medium subsequent to insertion of the trigger data into the input stream.

14. A system, comprising:

a storage medium;

a trigger inserter unit communicatively coupled to the storage medium to combine trigger data with Transport Type B stream to obtain a simulated Transport Type A stream, and to store the simulated Transport Type A stream in the storage medium;

a stream simulator unit communicatively coupled to the trigger inserter unit to provide the simulated Transport Type A stream to a receiver unit; and a proxy unit responsive to the receiver unit to retrieve resource data associated with the trigger data in the simulated Transport Type A stream from the storage medium, and to provide the retrieved resource data to the receiver unit.

15. The system of claim 14 wherein the trigger inserter unit, stream simulator unit, and proxy unit comprise components of the receiver unit.

16. The system of claim 14 wherein the proxy unit is capable to retrieve the resource data associated with the trigger data from a local storage medium, if the resource data is stored in the local storage medium, or from an external network, if the resource data is not stored in the storage medium.

17. The system of claim 14 wherein the Transport Type B stream comprises a video stream and wherein the trigger inserter unit is capable to insert the trigger data into a vertical blanking interval of the video stream.

* * * * *

UNITED STATES PATENT AND TRADEMARK OFFICE
CERTIFICATE OF CORRECTION

PATENT NO. : 6,795,973 B1
DATED : September 21, 2004
INVENTOR(S) : Estipona

It is certified that error appears in the above-identified patent and that said Letters Patent is hereby corrected as shown below:

Column 8,
Line 26, delete "formnatting" and insert -- formatting --.

Column 9,
Line 24, after "with" insert -- an --.

Signed and Sealed this

Twenty-first Day of June, 2005

JON W. DUDAS
*Director of the United States Patent and Trademark Office*